US010723604B2

(12) United States Patent
Urban et al.

(10) Patent No.: US 10,723,604 B2
(45) Date of Patent: Jul. 28, 2020

(54) COMPACT REMOVABLE DISPLAY HOIST (71) Applicant: Aristocrat Technologies Australia Pty Limited, North Ryde, NSW (AU)

(72) Inventors: Bruce Urban, Las Vegas, NV (US); Reginna Eatman, Las Vegas, NV (US); Anthony Firmani, Henderson, NV (US); Max Skaare, Laguna Niguel, CA (US); Paul R. Sylvia, North Las Vegas, NV (US); Scott Olive, Brookvale (AU); John Curtis, Gold Coast (AU); Thomas Frawley, Gold Coast (AU)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 0 days.

(21) Appl. No.: 16/373,237

(22) Filed: Apr. 2, 2019

(65) Prior Publication Data

US 2019/0270626 A1 Sep. 5, 2019

Related U.S. Application Data (63) Continuation of application No. 15/666,140, filed on Aug. 1, 2017, now Pat. No. 10,287,148.

(51) Int. Cl.
*F16M 11/00* (2006.01)
*B66F 9/02* (2006.01)
*A47B 9/20* (2006.01)
*F16M 11/20* (2006.01)

(52) U.S. Cl.
CPC ................ *B66F 9/02* (2013.01); *A47B 9/20* (2013.01); *F16M 11/20* (2013.01); *A47B 2200/0052* (2013.01)

(58) Field of Classification Search
CPC . F16M 11/18; Y10S 248/918; Y10S 248/917; Y10S 248/92; A47B 9/20; A47B 2097/006
USPC ...... 248/125.1, 125.2, 131, 278.1, 132, 917, 248/919, 125.7, 295.11, 296.1, 297.21
See application file for complete search history.

(56) References Cited

U.S. PATENT DOCUMENTS

| 3,891,063 | A | 6/1975 | Lucasey |
| 4,025,017 | A | 5/1977 | Miller |
| 5,310,152 | A | 5/1994 | O'Neill |
| 5,797,504 | A | 8/1998 | Mangum |
| 6,352,226 | B1 | 3/2002 | Gordon |
| 6,695,266 | B1 * | 2/2004 | Tsai ........................ A47G 33/06 248/125.8 |
| 7,168,665 | B2 | 1/2007 | Hong |
| 7,410,226 | B1 | 8/2008 | Meskan |

(Continued)

OTHER PUBLICATIONS

AU Patent Examination Report in AU Application No. 2018204134, dated Apr. 12, 2019. 3 Pages.

*Primary Examiner* — Steven M Marsh
(74) *Attorney, Agent, or Firm* — Armstrong Teasdale LLP (57) ABSTRACT A removable display hoist includes a first clamp configured to be removably coupled to a first portion of a telescoping support member, a second clamp configured to be removably coupled to a second portion of the telescoping support member, and an actuator assembly coupled between the first clamp and the second clamp, where the actuator assembly is configured to extend and retract the removable display hoist.

18 Claims, 9 Drawing Sheets (56) References Cited

U.S. PATENT DOCUMENTS

| | | |
|---|---|---|
| 8,083,458 B2 | 12/2011 | Wilkie |
| 8,231,108 B2 | 7/2012 | Realegeno-Amaya |
| 8,286,927 B2 * | 10/2012 | Sweere .............. A47B 21/0073 |
| | | 248/297.21 |
| 9,091,393 B2 | 7/2015 | Huang |
| 9,791,093 B2 | 10/2017 | Aoyagi |
| 10,024,069 B2 * | 7/2018 | Bond ...................... E04G 11/38 |
| 2004/0188573 A1 | 9/2004 | Weatherly |
| 2005/0045077 A1 | 3/2005 | Bober |
| 2005/0109892 A1 | 5/2005 | Bober |
| 2007/0152112 A1 | 7/2007 | Bober |
| 2007/0158627 A1 | 7/2007 | Dittmer |
| 2008/0054238 A1 | 3/2008 | Craig |
| 2008/0087775 A1 * | 4/2008 | Kuo ........................ F16C 29/02 |
| | | 248/125.1 |

\* cited by examiner

COMPACT REMOVABLE DISPLAY HOIST

CROSS-REFERENCE TO RELATED APPLICATION

This application is a continuation and claims the benefit of U.S. patent application Ser. No. 15/666,140, filed Aug. 1, 2017, entitled COMPACT REMOVABLE DISPLAY HOIST, which is incorporated by reference herein in its entirety.

BACKGROUND

The subject matter of the present disclosure relates to a removable display hoist, and more particularly, to a compact removable display hoist configured to be coupled to a telescoping support member of a display system, such that, during operation, a display is raised or elevated on the display system.

In the casino gaming industry, overhead displays are often used to advertise a game or bank of games. To advertise effectively, many overhead displays are made quite large and are designed to be mounted high over a particular game or bank of games, e.g., at a presentation level, which may range to a distance of between seven and ten feet from a casino floor. In weight, common overhead displays range in the hundreds of pounds.

The effort required to mount such large overhead displays can be significant, particularly in the case of manual installation, such as an installation performed by a technician using a ladder. Manual installation may also pose a danger to the technician, such as from a risk of falling. To relieve some of the difficulty associated with purely manual installation, in some cases, a mounting system, such as a small crane lift, may be engaged with the display to raise the display to the presentation level. However, such systems are themselves bulky and may be awkward to transport and utilize within the confines of a bustling casino.

A removable display hoist, as described herein, is therefore desirable. More particularly, a compact removable display hoist capable of being coupled to and decoupled from a telescoping support member of a display system to raise or lower an overhead display of the display system is desirable. It is further desirable that the removable display hoist be easily transportable by a single technician (e.g., in a single trip) and configured for close-quarters operation on a busy casino gaming floor.

BRIEF DESCRIPTION

In one aspect, a removable display hoist is provided. The removable display hoist includes a first clamp configured to be removably coupled to a first portion of a telescoping support member, a second clamp configured to be removably coupled to a second portion of the telescoping support member, and an actuator assembly coupled between the first clamp and the second clamp, where the actuator assembly is configured to extend and retract the removable display hoist.

In another aspect, a system is provided. The system includes a first display hoist comprising a first system of clamps, where the first display hoist is configured to be removably coupled to a first telescoping support member to raise a display on the first telescoping support member. The system also includes a second display hoist comprising a second system of clamps, where the second display hoist is configured to be removably coupled to a second telescoping support member to raise the display on the second telescoping support member.

In yet another aspect, a method for hoisting a display is provided. The method includes actuating a first removable display hoist, where the first removable display hoist includes a first clamp configured to be removably coupled to a first portion of a first telescoping support member, a second clamp configured to be removably coupled to a second portion of the first telescoping support member, and a first actuator assembly coupled between the first clamp and the second clamp. The first actuator assembly is configured to extend and retract the first removable display hoist.

BRIEF DESCRIPTION OF THE DRAWINGS

An exemplary embodiment of the subject matter disclosed will now be described with reference to the accompanying drawings.

DETAILED DESCRIPTION

Exemplary embodiments of the present disclosure relate to a removable display hoist. The removable display hoist facilitates deployment of a large overhead display within a casino. In particular, embodiments of the removable display hoist include a first clamp configured to be coupled to an inner member of a telescoping support member of a display system and a second clamp configured to be coupled to an outer member of the telescoping support member. As the removable display hoist is actuated, the hoist drives the outer member of the telescoping support member over its inner member to place the telescoping support member in an extended or telescoped position. In the exemplary embodiment, a first removable display hoist is coupled to a first telescoping support member and a second removable display hoist is coupled to a second telescoping support member, and each display hoist is actuated in tandem, such that an overhead display mounted atop each telescoping support member is raised to a presentation level.

FIGS. 1-5 generally relate to an exemplary gaming machine and an exemplary network of gaming machines and are intended, in part, to provide a backdrop against which the removable display hoist described herein may be understood. For example, a removable display hoist, as described herein, may be deployed in conjunction with one or more gaming machines, one or more networks of gaming machines, and the like. In some cases, the removable display hoist may be coupled to one or more gaming machines or networks of gaming machines. For instance, the removable display hoist may be communicatively coupled to a gaming machine or a bank of gaming machines, such that the one or more gaming machines are operable to provide control instructions to the removable display hoist.

Accordingly, gaming machines of the present disclosure may be implemented in various configurations for gaming machines, including but not limited to: (1) a gaming machine in which the computerized instructions for controlling one or more games are stored within the gaming machine prior to delivery to a gaming establishment; and/or (2) a changeable gaming machine in which the computerized instructions for controlling one or more games are subsequently downloaded to the gaming machine through a data network after the gaming machine is installed within in a gaming establishment.

In an exemplary embodiment, the computerized instructions for controlling one or more games may be executed by a server, such as, for example, a central controller or remote host. In such a "thin client" architecture, the server may remotely control one or more games, or other suitable interfaces, via a gaming network, and the gaming machine may be used to display the games, or suitable interfaces, and to receive inputs or commands from a player.

In another exemplary embodiment, the instructions for controlling one or more games are communicated from a server to a local processor and memory coupled within a gaming machine. In such a "thick client" architecture, a processor of the gaming machine may execute the communicated instructions to control the game or games and/or other suitable interfaces provided to a player.

In another exemplary embodiment, one or more gaming machines within a gaming machine network may utilize a thin client architecture and one or more gaming machines within a gaming machine network may utilize a thick client architecture. Similarly, in various exemplary embodiments, certain functions of a particular gaming machine may be implemented in a thin client architecture and certain other functions of the gaming machine may be implemented in a thick client architecture. For instance, instructions for controlling a game or games may be communicated from a server to one or more network gaming machines operating in a thick client configuration, while instructions for controlling any secondary games or bonus gaming functions may executed by the server in a thin client configuration.

Figure 1:
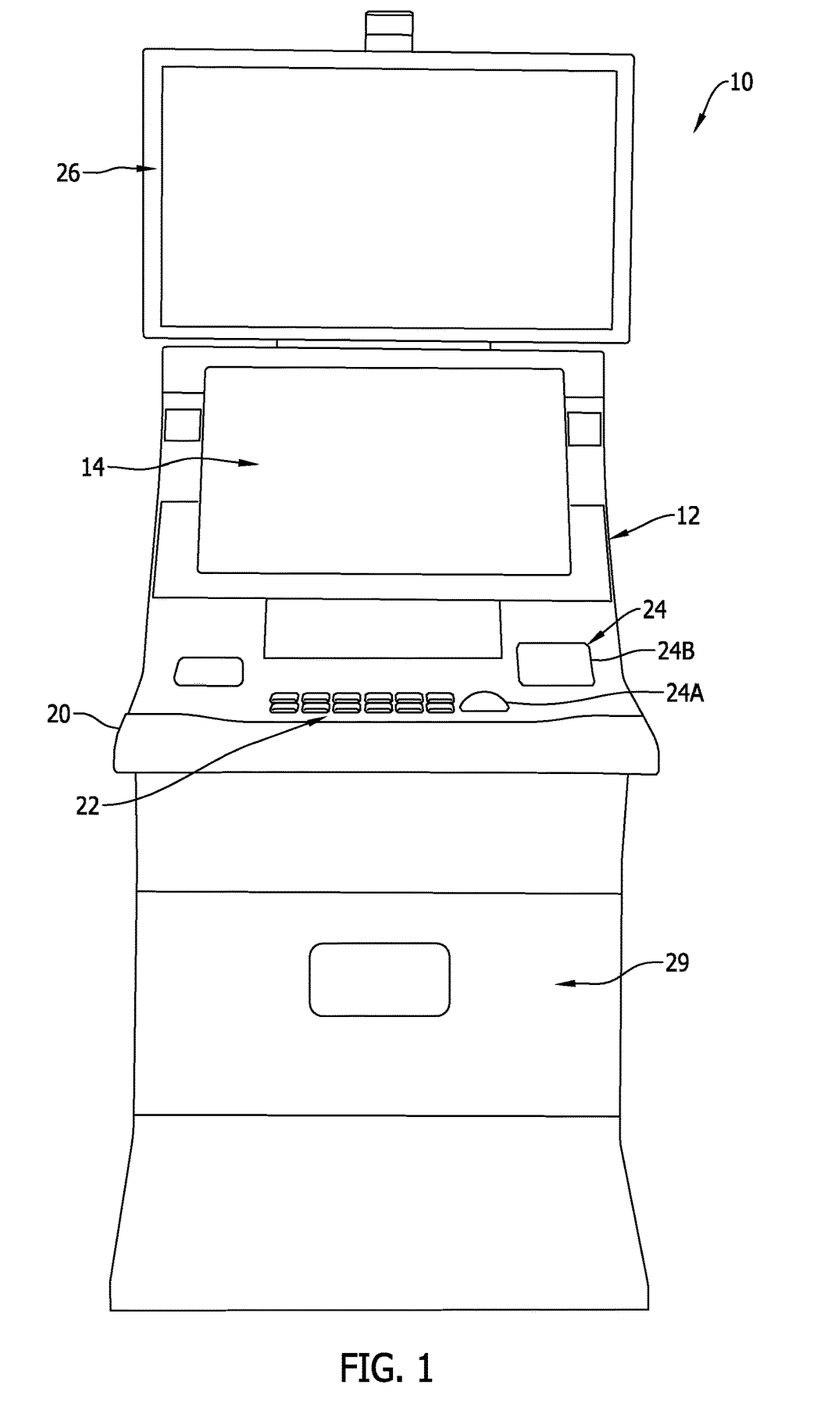
FIG. 1 is a block diagram of exemplary components of a gaming machine.

FIG. 1 is a perspective view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure.

In an exemplary embodiment, gaming machine 10 may include a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module configured to scan or read a player tracking device, such as, for example a loyalty or player tracking card implemented within a casino as part of a loyalty program. The player tracking device may be in the form of a card, flash drive, and/or any other portable storage medium capable of being read by the reading device. In some embodiments, the player marketing module may be configured to transfer credits between gaming machine 10 and the player tracking device.

Gaming machine 10 may further include a top box 26, which may, in turn, include artwork, such as, for example, artwork depicting one or more pay tables, bonus award information, an upper display (not shown), and/or other game information or imagery. Further artwork and/or information may be provided on a front panel 29 of console 12. A coin tray 30 may be mounted beneath front panel 29 for dispensing cash payouts from gaming machine 10.

Display 14 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

Figure 2:
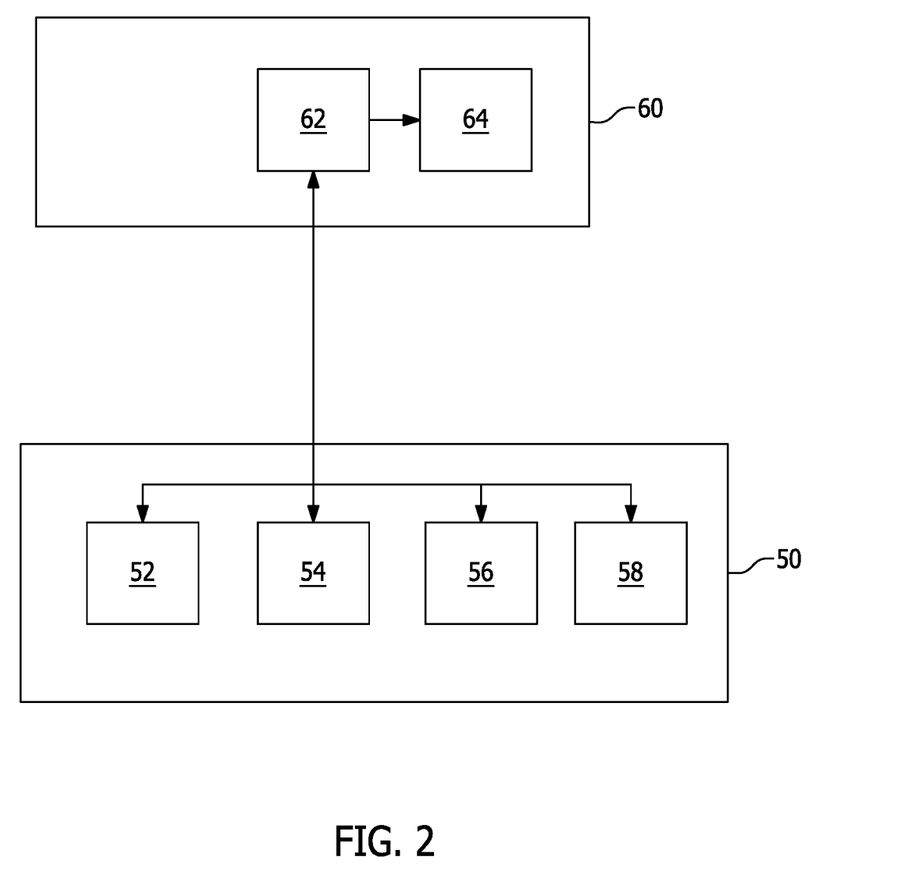
FIG. 2 is a perspective view of an exemplary gaming machine.

FIG. 2 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 24, at least one display 14, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 54.

Memory 64 may include any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, random or pseudo-random number generators, or numbers generated by a random number of pseudo-random number generator, look-up table data, and/or information and applicable game rules that relate to the play of gaming machine 10.

Figure 3:
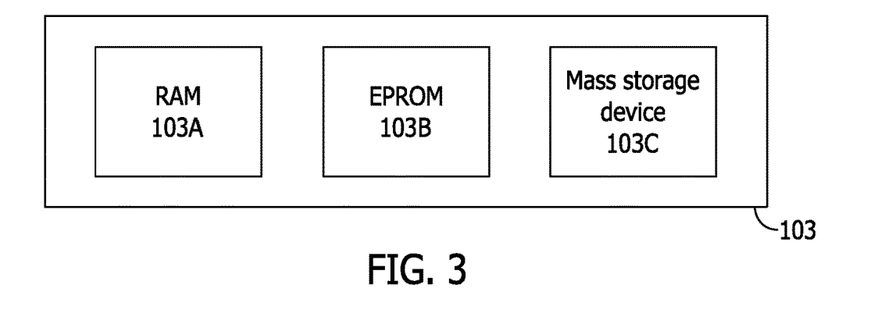
FIG. 3 is a block diagram of exemplary components of a gaming machine.

With brief attention to FIG. 3, a block diagram of memory 64 is shown. Memory 64 may, in various embodiments, include a memory 103 (as described herein with reference to FIG. 3). Memory 103 may include random access memory (RAM) 103A, such as non-volatile RAM (NVRAM), magnetic RAM (MRAM), ferroelectric RAM (FeRAM) and other forms as commonly understood in the gaming industry. Memory 103 may further include read only memory (ROM), such as EPROM 103B or electrically erasable programmable read only memory (EEPROM). Memory 64 may further include one or more mass storage devices 103C, such as one or more hard drives, one or more solid state or flash memory components, one or more CD and/or DVD drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may include a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may include a device that has obtained approval from a regulatory gaming commission or a device that has not obtained approval from a regulatory gaming commission. It should also be appreciated that processor 62 and memory 64 may be collectively referred to herein as a "computer" or "controller."

Returning briefly to FIG. 1, in an exemplary embodiment, credit input mechanism 24 may be coupled in communication with processor 62. Credit input mechanism 24 may include any suitable credit input mechanism or device, such as a coin input chute 24A, a bill or ticket collector 24B, and the like. Credit input mechanism may be configured to receive any suitable monetary credit, such as money, coins, tokens, tickets, and the like. In various embodiments, credit input mechanism 24 may further include card reader devices, such as credit or debit card readers or validators for credit cards, debit cards, printed ticket printers and/or readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may include a game activation device, such as a pull arm or one or more play button 22 that enables the player to start the game or a sequence of events in gaming machine 10. Play button 22 may include any suitable play activator such as a bet one button, a max bet button, or a repeat the bet button. In an embodiment, after appropriate funding of gaming machine 10, game play may begin automatically.

In an exemplary embodiment, one input device may include a "Bet One" button. A player may place a wager or bet by pushing the Bet One button and may increase the wager by repeatedly depressing or selecting the Bet One button. In various embodiments, an input device includes a "Bet Max" button that enables a player to place a maximum wager permitted during a particular game or game session.

In various embodiments, an input device may also include a "Cash Out" button. A player may depress or select a Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of a Cash Out button.

In various embodiments, an input device may include a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

Figure 4:
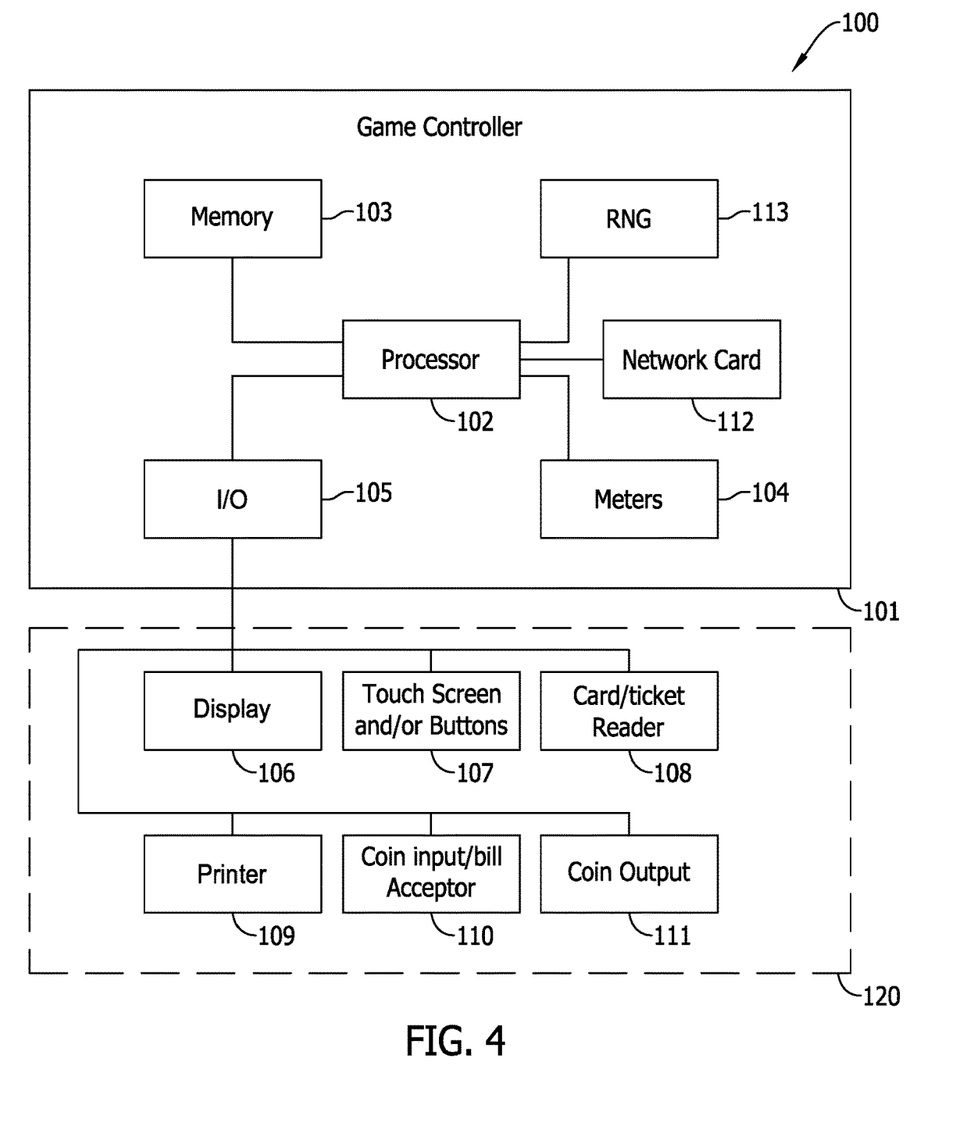
FIG. 4 is a schematic diagram of exemplary components of a memory.

FIG. 4 illustrates a more detailed block diagram of various exemplary functional components of a gaming machine 100, which may be the same as or different from gaming machine 10 (as shown in FIG. 2). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from memory 103 as described below.

Accordingly, gaming machine 100 may include a game controller 101 (which may include a processor 102 mounted on a circuit board, as described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include one or more gaming meters, such as, for example, one or more meters implemented in software, one or more hardware meters 104, and/or any suitable combination of software and/or hardware meters (to ensure regulatory compliance and to monitor player credit). Gaming machine 100 may also include an input/output (I/O) interface 105 for communicating with peripheral devices of gaming machine 100. Input/output interface 105 and/or the peripheral devices may include intelligent devices with their own memory for storing associated instructions and data. A random number generator module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 5:
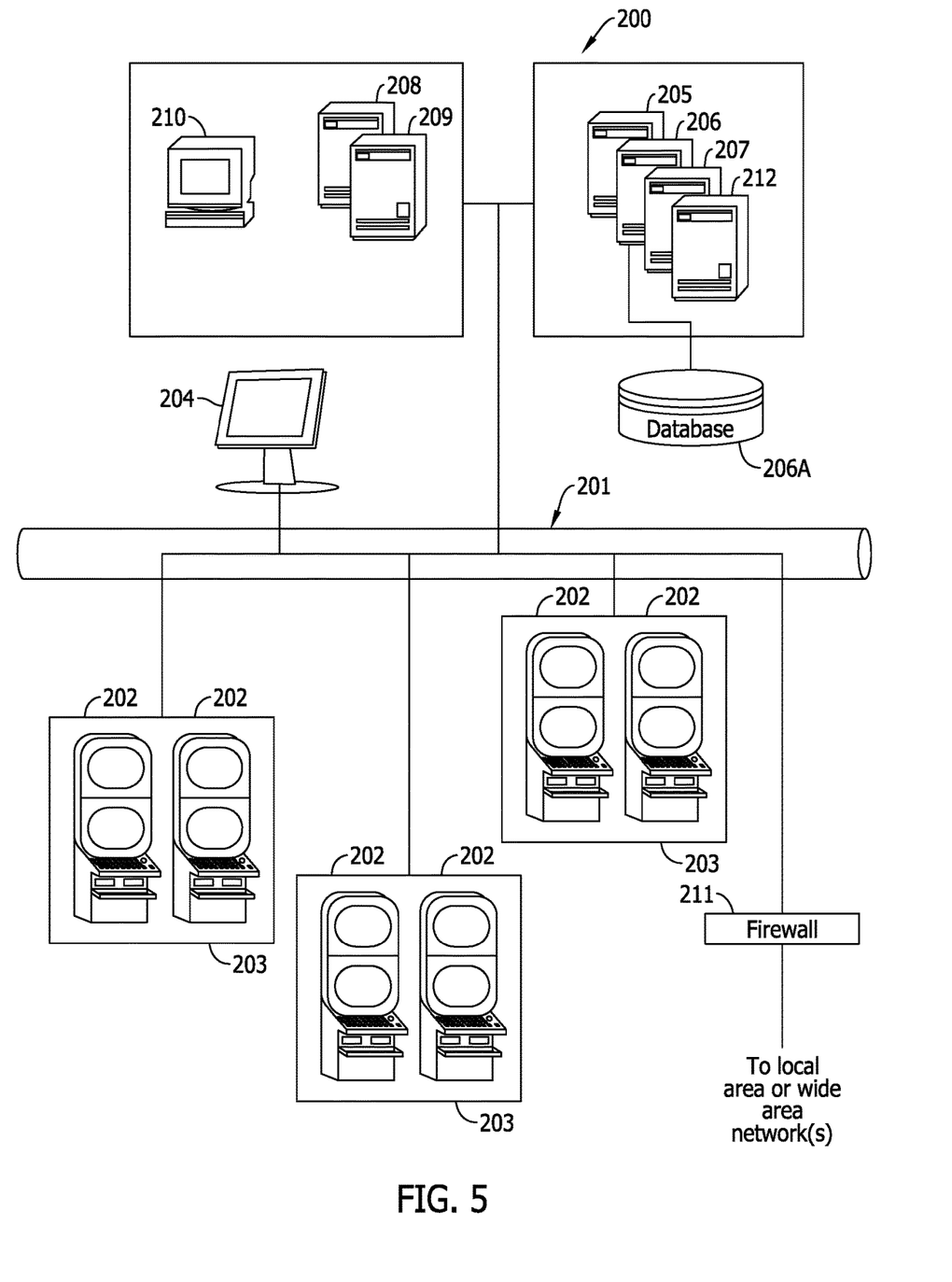
FIG. 5 is a schematic diagram of an exemplary network gaming system.

FIG. 5 illustrates such an exemplary distributed gaming system 200. Gaming system 200 may include a network 201, which, for example, may include a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 2 and 3), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively include a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A loyalty program server 212 may also be provided.

In a thin client embodiment, game server 205 may implement most or all of the game played by a player using gaming machine 202, and gaming machine 202 may, in essence, function provide little more than the player interface. In such an embodiment, game server 205 may include the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet Communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may include an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

With reference now to FIGS. 6-10, a display system including a plurality of removable display hoists is described. As described herein, the display system, including any number of removable display hoists, may be coupled to and/or used with the electronic gaming machines and systems described above. For example, a removable display hoist may be coupled to an electronic gaming machine and/or configured to stand over one or more gaming machines or banks of gaming machines.

Figure 6:
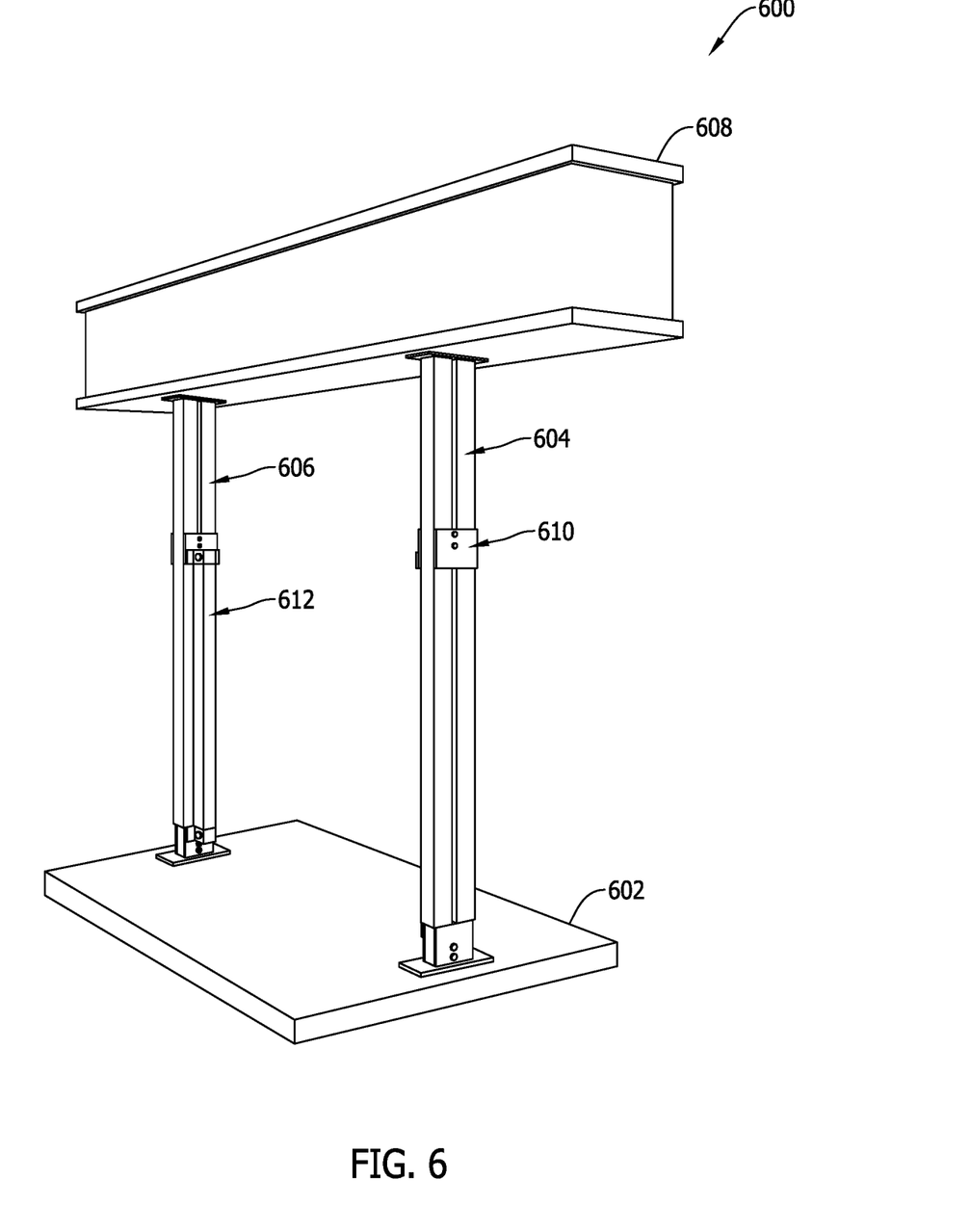
FIG. 6 is a perspective view of a display system configured for use with at least one removable display hoist.

FIG. 6 is a perspective view of a display system 600 configured for use with a plurality of removable display hoists. In the exemplary embodiment, display system 600 includes a base 602, a first telescoping support member 604, a second telescoping support member 606, and a display 608. As shown, display 608 is coupled to and mounted atop first telescoping support member 604 and second telescoping support member 606.

As described in greater detail below, first telescoping support member 604 and second telescoping support member 606 each include an inner member disposed within and configured to slide into and out of a tubular outer member. Support members 604 and 606 are thus "telescoping," in that a length or height of each member 604 and 606 is adjustable.

To hoist display 608, a first removable display hoist 610 and a second removable display hoist 612 may be coupled to first telescoping support member 604 and second telescoping support member 606, respectively. More particularly, first removable display hoist 610 may be coupled to first telescoping support member 604 to adjust a length of (e.g., raise and/or lower) first telescoping support member 604, and second removable display hoist 612 may be coupled to second telescoping support member 606 to adjust a length of (e.g., raise and/or lower) second telescoping support member 606. In other words, first removable display hoist 610 and second removable display hoist 612 can be coupled to a respective support member 604 and 606 to effect telescopic motion of the respective support member 604 and 606. As telescoping support members 604 and 606 are raised and lowered, display 608 (mounted atop members 604 and 606) is also raised and lowered. Thus, first removable display hoist 610 and second removable display hoist 612 are configured to drive a respective telescoping support member 604 and 606 through a range of telescopic motion to raise and/or lower display 608.

Figure 7:
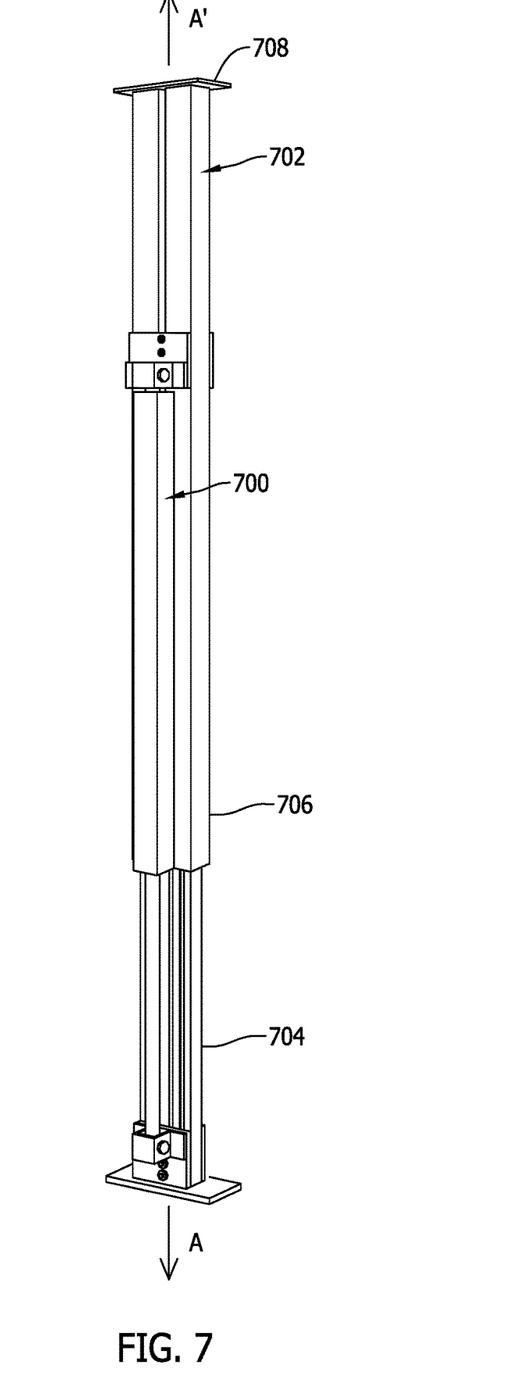
FIG. 7 is a front view of a removable display hoist, as shown at FIG. 6.

FIG. 7 is a front view of a removable display hoist 700, such as either of removable display hoist 610 and/or removable display hoist 612 (shown at FIG. 6). Removable display hoist 700 is shown coupled to a telescoping support member 702, such as either of first telescoping support member 604 and/or second telescoping support member 606 (shown at FIG. 6). Although a single removable display hoist 700 is described with respect to FIG. 7, it will be understood that display system 600 includes two telescoping support members (e.g., telescoping support members 604 and 606). Thus, in operation, two removable display hoists 610 and 612 may be implemented in conjunction with each of the telescoping support members 604 and 606. More generally, any suitable number of removable display hoists may be implemented, such as, for example, to match a number of telescoping support members supporting display 608.

In the exemplary embodiment, telescoping support member 702 extends along the axis A-A' and includes an inner member 704 and an outer member 706. Inner member 704 and outer member 706 are elongated structural members. Further, as described briefly above, outer member 706 is generally tubular and includes an inner surface (not shown) defining a generally tubular passage (not shown) through which inner member 704 extends. During operation, outer member 706 telescopes (e.g., slides or translates) over inner member 704 along the axis A-A', such that outer member 706 is raised and/or lowered over inner member 704 to raise and/or lower display 608, which may be coupled to and mounted on a mounting flange 708 of outer member 706.

Figure 8:
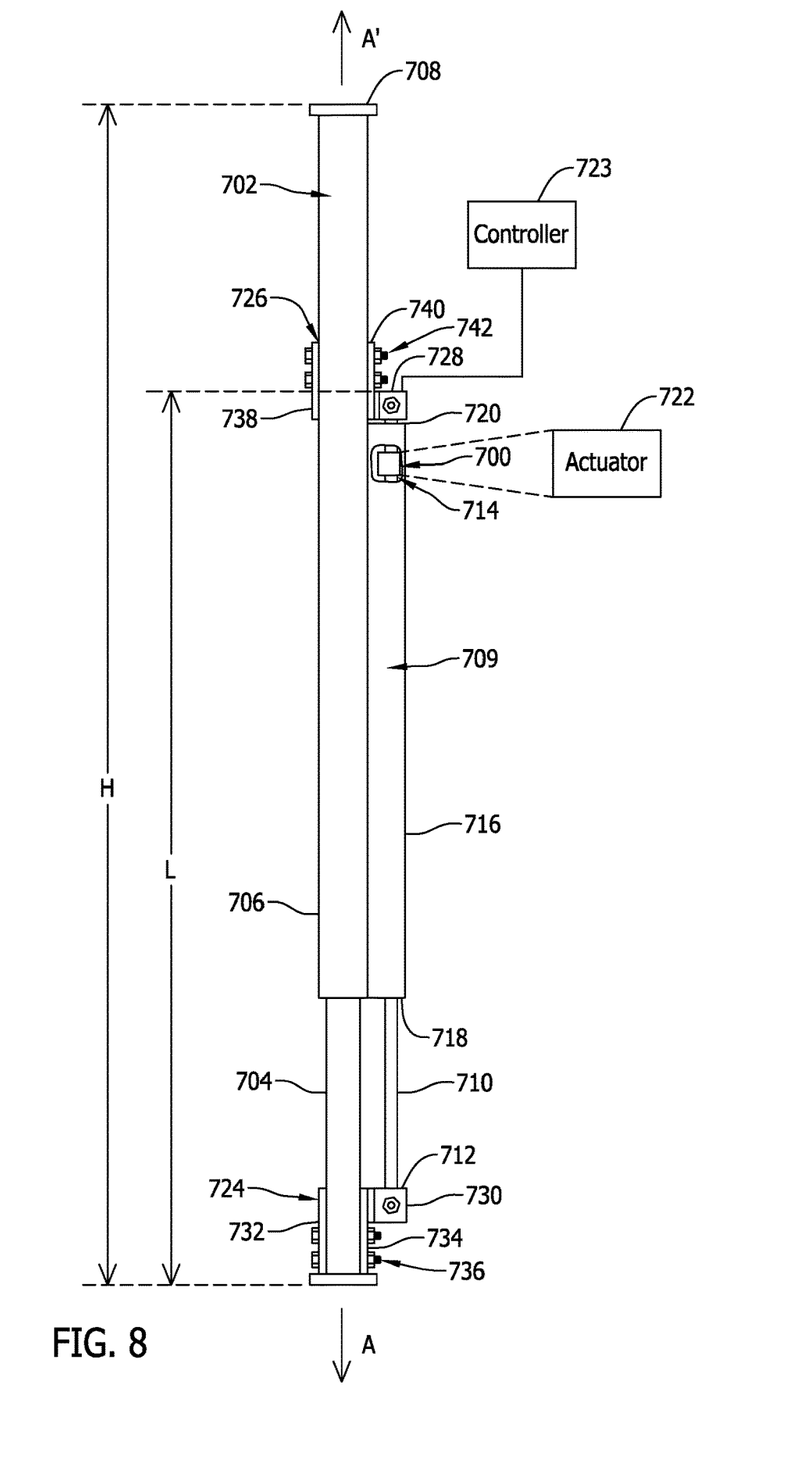
FIG. 8 is a side view of a removable display hoist, as shown at FIG. 6.

FIG. 8 is a side view of removable display hoist 700 (shown at FIG. 7). Removable display hoist 700 is shown coupled to telescoping support member 702. In the exemplary embodiment, removable display hoist 700 includes an actuator assembly 709, which may include a piston 710 having a first end 712 and a second end 714. Actuator assembly 709 also includes a housing 716 that extends at least partially about piston 710 and within which piston 710 is able to travel, such as parallel to the axis A-A'. Thus, housing 716 telescopes over piston 710, similar to the way that outer member 706 of telescoping support member 702 telescopes over inner member 704. Housing 716 also includes a bottom end 718 and a top end 720.

Further, as shown, actuator assembly 709 of removable display hoist 700 includes an actuator motor 722. In various embodiments, actuator motor 722 is any suitable motor, such as, for example, any suitable linear actuator or linear motor. In some embodiments, actuator motor 722 may include a rotary motor, which may be coupled to piston 710 through an assembly configured to convert rotary motion to linear motion. In other embodiments, actuator motor 722 may be configured for manual operation. For example, in some embodiments, actuator motor 722 may include a hand crank, which an installation technician may turn to actuate removable display hoist 700, as described herein. Actuator motor 722 is secured within housing 716 and coupled to second end 714 of piston 710. Thus, actuator motor 722 is configured to drive piston 710 of removable display hoist 700.

In the exemplary embodiment, a controller 723, such as a display hoist controller, is communicatively coupled to removable display hoist 700. For example, in some embodiments, controller 723 is coupled to actuator motor 722 and provides control instructions to actuator motor 722, such as an instruction engage or drive actuator motor 722, which may, as described herein, cause removable display hoist 700 to engage with and raise and/or lower telescoping support member 702.

In addition, although not shown, removable display hoist 700 and/or controller 723 may be coupled to a power source, which may provide electrical power to removable display hoist 700 during operation. In some cases, the power source may reside in an electronic gaming machine proximal to removable display hoist 700. Similarly, in some cases, controller 723 may couple to a controller of a proximal electronic gaming machine and/or through a controller of a proximal electronic gaming machine to a backend server. In other embodiments, controller 723 may simply be a gaming machine controller and/or a controller residing on a backend system. Thus, in various embodiments, an electronic gaming machine controller and/or a backend server may provide one or more control instructions to controller 723 of removable display hoist 700.

Removable display hoist 700 also includes a first clamp 724 and a second clamp 726. First clamp 724 may be coupled to top end 720 of housing 716. However, in other embodiments, first clamp 724 may be coupled to piston 710, housing 716, and/or actuator motor 722 through a mounting joint 728, which may couple to and/or extend over top end 720 of housing 716. Similarly, second clamp 726 may be coupled to first end 712 of piston 710, such as through a mounting joint 730, which may extend from first end 712 of piston 710. In various embodiments, mounting joints 728 and/or 730 may be bonded (e.g., heat bonded) or otherwise fastened or secured to first clamp 724 and/or second clamp 726, respectively.

In the exemplary embodiment, first clamp 724 includes a first flange 732, a second flange 734, and one or more fasteners 736 configured to extend through first flange 732 and second flange 734. For example, first flange 732 and second flange 734 may include one or more mounting holes (not shown) through which one or more fasteners 736 (e.g., one or more bolts) may be inserted. Similarly, second clamp 726 includes a first flange 738, a second flange 740, and one or more fasteners 742 configured to extend through first flange 738 and second flange 740. For example, first flange 738 and second flange 740 may include one or more mounting holes (not shown) through which one or more fasteners 742 (e.g., one or more bolts) may be inserted.

To mount removable display hoist 700 on telescoping support member 702, a user, such as an installation technician, may couple first clamp 724 to inner member 704 and second clamp 726 to outer member 706. Specifically, a user may sandwich or clamp inner member 704 between first flange 732 and second flange 734 of first clamp 724. The user may, in addition, insert at least one fastener 736 through first flange 732 and second flange 734 to secure first clamp 724 on inner member 704. The at least one fastener 736 may, in some embodiments, extend through a gap or another suitable opening in inner member 704, such that inner member 704 is sandwiched or clamped between first flange 732 and second flange 734.

Similarly, to couple second clamp 726 to outer member 706, a user may sandwich or clamp outer member 706 between first flange 738 and second flange 740 of second clamp 726. The user may, in addition, insert at least one fastener 742 through first flange 738 and second flange 740 to secure second clamp 726 on outer member 706. The at least one fastener 742 may, in some embodiments, extend through a gap or another suitable opening in outer member 706, such that outer member 706 is sandwiched or clamped between first flange 738 and second flange 740.

Removable display hoist 700 may thus be coupled to telescoping support member 702 by way of first clamp 724 and second clamp 726. Removable display hoist 700 may also be decoupled from telescoping support member 702 by simple removal of first clamp 724 and second clamp 726 from telescoping support member 702. Thus, in the exemplary embodiment, removable display hoist 700 can be coupled to and decoupled from telescoping support member

702. In the instance that removable display hoist 700 is decoupled from telescoping support member 702, telescoping support member 702 may be maintained in an extended or telescoped position by a locking mechanism (such as one or more fasteners inserted through telescoping support member 702) applied after removable display hoist 700 is decoupled from telescoping support member 702. As such, the coupling and decoupling operations described herein are simple and do not require a large number of tools. In addition, and as shown in the Figures, removable display hoist 700 is relatively compact and may be transported and utilized in close-quarters, such as on a busy casino floor.

In some embodiments, removable display hoist 700 may be configured to be left permanently and/or semi-permanently on telescoping support member 702 after installation and/or, in some cases, a display system, such as display system 600, may include telescoping support members that are preinstalled with removable, or fixed (non-removable) display hoists. In other words, in some embodiments, a display hoist, such as display hoist 700, may not be removable from a telescoping support member, or display hoist 700 may be removable, but may be intended to be left coupled to a telescoping support member after installation.

Figure 9:
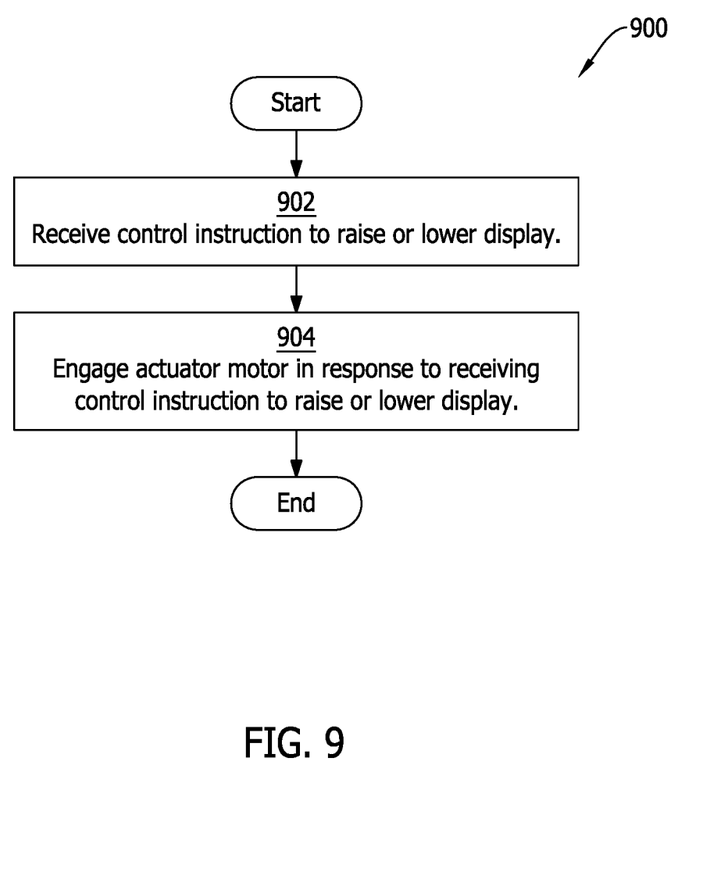
FIG. 9 is a flowchart illustrating an exemplary process for hoisting a display using the display system shown at FIG. 6.

FIG. 9 is a flowchart illustrating an exemplary process 900 for hoisting display 608. Accordingly, in operation, controller 723 of removable display hoist 700 may receive a control instruction, such as from a user, to raise or lower display 608 (step 902). In response, controller 723 may provide a control signal to actuator motor 722, which may cause actuator motor 722 to actuate or engage piston 710, such that piston 710 is impelled from and/or retracted into housing 716, and such that removable display hoist 700 telescopes (e.g., extends and/or retracts) axially parallel to the axis A-A' (step 904). In other words, as actuator motor 722 engages piston 710, removable display hoist 700 telescopes, and a length, "L," of removable display hoist 700 increases and/or decreases (depending upon the control signal provided to actuator motor 722).

Further, as removable display hoist 700 telescopes, removable display hoist 700 raises or lowers outer member 706 of telescoping support member 702 on inner member 704, causing outer member 706 to telescope on inner member 704. More particularly the coupling between first clamp 724 and inner member 704 and second clamp 726 and outer member 706 permits removable display hoist 700 to raise and/or lower outer member 706 on inner member 704, such that outer member 706 telescopes on or is raised and/or lowered over inner member 704. As outer member 706 telescopes on inner member 704, display 608 is simultaneously hoisted on outer member 706, such as to a presentation level, "H." In the case that outer member 706 is lowered on inner member 704, display 608 may be lowered to any suitable level, such as a working level (e.g., of several feet from the ground), which may be useful for maintenance and/or removal of display 608.

In various embodiments, removable display hoist 700 may include a plurality of stop positions. For example, removable display hoist 700 may include any suitable number of stop positions, each of which may correspond to a designated presentation and/or working level. In other embodiments, removable display hoist 700 may be capable of stopping at any location or position within its range of travel. Thus, in some embodiments, removable display hoist 700 includes a continuously variable range of stop positions (e.g., a non-discrete number of stop positions).

Figure 10:
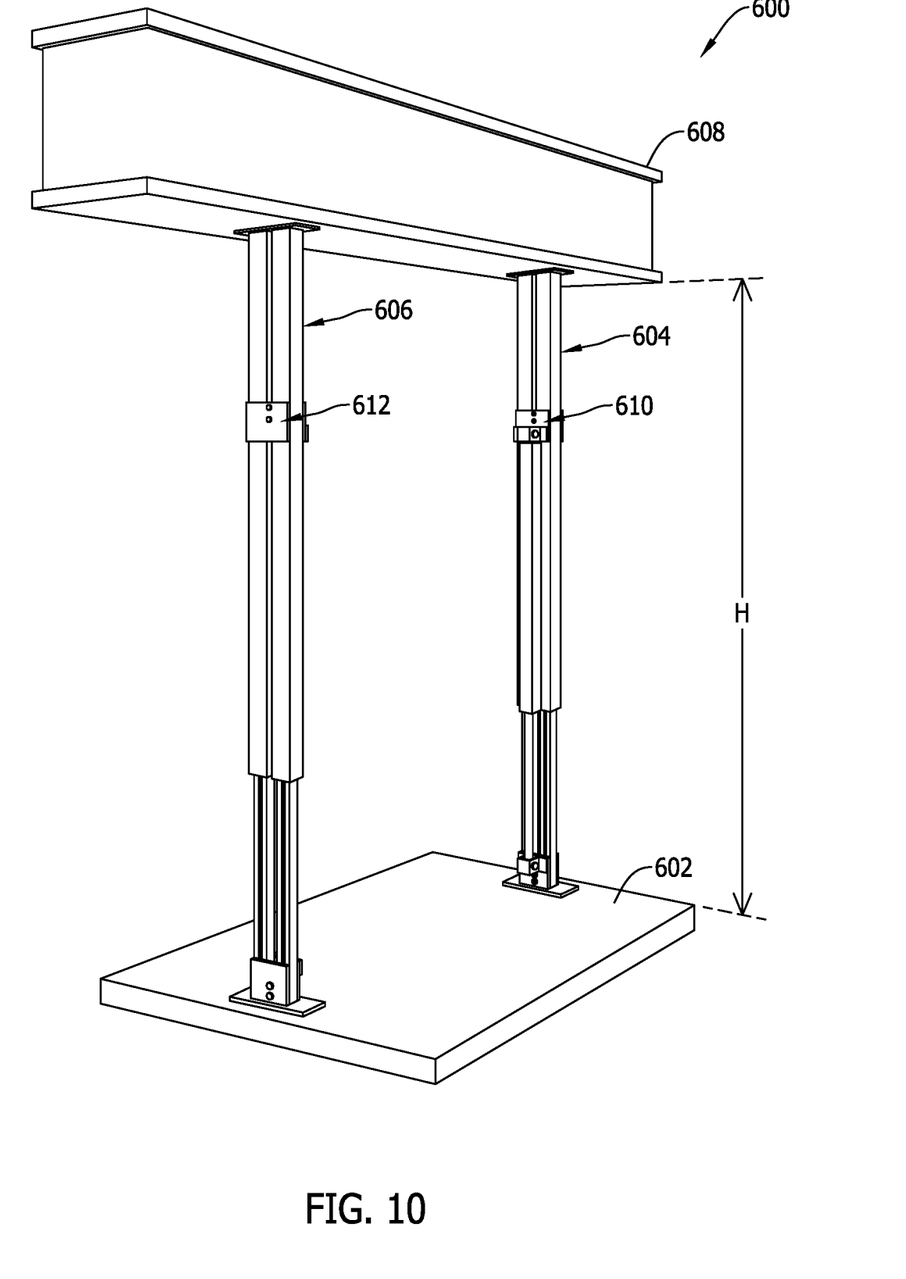
FIG. 10 is a perspective view of the display system shown at FIG. 6, in which the display system is in a raised position.

FIG. 10 is a perspective view of display system 600 (shown at FIG. 6) in a deployed or raised position. Accordingly, to raise display 608, first removable display hoist 610 may be coupled to first telescoping support member 604, and second removable display hoist 612 may be coupled to second telescoping support member 606. In operation, each removable display hoist 610 and 612 may be controlled (e.g., by controller 723). Specifically, each removable display hoist 610 and 612 may be actuated or engaged with a respective telescoping support member 604 and 606 to raise and lower display 608 on each telescoping support member 604 and 606. In the exemplary embodiment, controller 723 may control each removable display hoist 610 and 612, such that each removable display hoist 610 and 612 raises and lowers a respective telescoping support member 604 and 606 at a uniform rate of ascent and/or descent.

Embodiments of the removable display hoist, as described above, facilitate deployment of a large overhead display within a casino. In particular, embodiments of the removable display hoist include a first clamp configured to be coupled to an inner member of a telescoping support member of a display system and a second clamp configured to be coupled to an outer member of the telescoping support member. As the removable display hoist is actuated, the hoist drives the outer member of the telescoping support member over its inner member to place the telescoping support member in an extended or telescoped position. In the exemplary embodiment, a first removable display hoist is coupled to a first telescoping support member and a second removable display hoist is coupled to a second telescoping support member, and each display hoist is actuated in tandem, such that the overhead display mounted atop each telescoping support member is raised to a presentation level.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

Exemplary embodiments of a system, method, and article of manufacture for electronic gaming as well as a removable display hoist and display system including a plurality of display hoists and related components are described above in detail. The disclosure is not limited to the specific embodiments described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the exemplary embodiment can be implemented and utilized in connection with many applications in which a game or bonus game is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A removable display hoist comprising:
   a first clamp configured to be removably coupled to an inner member of a telescoping support member, wherein the first clamp is configured to be mechanically coupled to the inner member;
   a second clamp configured to be removably coupled to an outer member of the telescoping support member, wherein the outer member is disposed at least partially over the inner member, and wherein the second clamp is configured to be mechanically coupled to the outer member; and
   an actuator assembly coupled between the first clamp and the second clamp, the actuator assembly configured to extend and retract the removable display hoist.

2. The removable display hoist of claim 1, wherein the actuator assembly comprises an actuator motor, a piston, and a housing disposed at least partially over the piston, the piston mechanically coupled to the to the first clamp at a first end and to the actuator motor at a second end, the housing mechanically coupled to the second clamp at a top end.

3. The removable display hoist of claim 2, further comprising a first mounting joint and a second mounting joint, the piston mechanically coupled to the first clamp through the first mounting joint, the housing mechanically coupled to the second clamp through the second mounting joint.

4. The removable display hoist of claim 1, wherein the actuator assembly comprises an actuator motor, and wherein the removable display hoist further comprises a display hoist controller communicatively coupled to the actuator motor, the display hoist controller configured to control the actuator motor to extend and retract the removable display hoist.

5. The removable display hoist of claim 1, wherein the first clamp comprises:
   a first flange; and
   a second flange, wherein the first flange and the second flange are configured to clamp the inner member of the telescoping support member.

6. The removable display hoist of claim 1, wherein the second clamp comprises:
   a first flange; and
   a second flange, wherein the first flange and the second flange are configured to clamp the outer member of the telescoping support member.

7. A system comprising:
   a first display hoist comprising a first system of clamps, the first display hoist configured to be removably coupled to a first telescoping support member to raise a display on the first telescoping support member, the first display hoist comprising:
      a first clamp configured to be coupled to an inner member of the first telescoping support member;
      a second clamp configured to be coupled to an outer member of the first telescoping support member; and
      an actuator assembly extending between the first clamp and the second clamp; and
   a second display hoist comprising a second system of clamps, the second display hoist configured to be removably coupled to a second telescoping support member to raise the display on the second telescoping support member.

8. The system of claim 7, wherein the actuator assembly is configured to engage the first clamp and the second clamp to extend and retract the first display hoist.

9. The system of claim 7, wherein the actuator assembly includes one of a linear actuator, a rotary motor, or a hand crank.

10. The system of claim 7, wherein the second display hoist further comprises:
    a first clamp configured to be coupled to an inner member of the first telescoping support member;
    a second clamp configured to be coupled to an outer member of the first telescoping support member; and
    an actuator assembly extending between the first clamp and the second clamp.

11. The system of claim 10, wherein the actuator assembly is configured to engage the first clamp and the second clamp to extend and retract the second display hoist.

12. The system of claim 10, wherein the actuator assembly includes one of a linear actuator, a rotary motor, or a hand crank.

13. A method for hoisting a display, the method comprising:
    actuating a first removable display hoist, the first removable display hoist comprising:
       a first clamp configured to be removably coupled to an inner member of a first telescoping support member supporting the display, wherein the first clamp is configured to be mechanically coupled to the inner member;
       a second clamp configured to be removably coupled to an outer member of the first telescoping support member supporting the display, wherein the outer member is disposed at least partially over the inner member, and wherein the second clamp is configured to be mechanically coupled to the outer member; and
       a first actuator assembly coupled between the first clamp and the second clamp, the first actuator assembly configured to extend and retract the first removable display hoist.

14. The method of claim 13, further comprising actuating a second removable display hoist, the second removable display hoist comprising:
    a first clamp configured to be removably coupled to a first portion of a second telescoping support member supporting the display;
    a second clamp configured to be removably coupled to a second portion of the second telescoping support member supporting the display; and
    a second actuator assembly coupled between the first clamp and the second clamp, the second actuator assembly configured to extend and retract the second removable display hoist.

15. The method of claim 14, further comprising:
    receiving, by a display hoist controller, an instruction to raise the display from a lower position to an elevated position;
    actuating the first removable display hoist in response to receiving the instruction; and
    actuating the second removable display hoist in response to receiving the instruction.

16. The method of claim 15, wherein the first removable display hoist is configured to be coupled to the display on a first side of the display, and wherein the second removable display hoist is configured to be coupled to the display on a second side of the display opposite the first side.

17. The method of claim 16, further comprising actuating the first removable display hoist and the second removable display hoist in tandem, such that the first side of the display and the second side of the display are raised at a substantially uniform rate of ascent.

18. The method of claim 13, wherein the first actuator assembly includes one of a linear actuator, a rotary motor, or a hand crank.

* * * * *